US010545290B2

(12) United States Patent
Bennett et al.

(10) Patent No.: US 10,545,290 B2
(45) Date of Patent: Jan. 28, 2020

(54) POLYMER CLAD FIBER FOR EVANESCENT COUPLING

(71) Applicant: Corning Incorporated, Corning, NY (US)

(72) Inventors: Kevin Wallace Bennett, Hammondsport, NY (US); Alan Frank Evans, Beaver Dams, NY (US); Ming-Jun Li, Horseheads, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/405,396

(22) Filed: Jan. 13, 2017

(65) Prior Publication Data

US 2017/0205583 A1 Jul. 20, 2017

Related U.S. Application Data

(60) Provisional application No. 62/279,987, filed on Jan. 18, 2016.

(51) Int. Cl.
*G02B 6/30* (2006.01)
*G02B 6/02* (2006.01)

(52) U.S. Cl.
CPC ........... *G02B 6/30* (2013.01); *G02B 6/02033* (2013.01)

(58) Field of Classification Search
USPC ....................... 385/30, 49, 52, 88–89, 92–93
See application file for complete search history.

(56) References Cited

U.S. PATENT DOCUMENTS 4,669,814 A * 6/1987 Dyott .................... C03B 37/027 359/900
5,046,809 A 9/1991 Stein
(Continued)

FOREIGN PATENT DOCUMENTS

CN 102866461 1/2013
EP 634679 A1 1/1995
(Continued)

OTHER PUBLICATIONS

T. Barwicz and Y. Taira, "Low-cost interfacing of fibers to nanophotonic waveguides: design for fabrication and assembly tolerances," IEEE Photonics Journal, vol. 6, No. 4, 6600818, (Aug. 2014).
(Continued)

*Primary Examiner* — Eric Wong
(74) *Attorney, Agent, or Firm* — Kevin L. Bray

(57) ABSTRACT

A fiber to waveguide coupler is provided that includes an optical fiber having a core and a cladding. The cladding includes an inner cladding and an outer cladding with a polymer. At least one of the core and inner cladding defines a substantially flat surface parallel with an axis of the optical fiber. The optical fiber defines a stripped portion substantially free of outer cladding configured to expose the at least one substantially flat surface of the core or inner cladding. A waveguide is configured to be evanescently coupled with the exposed at least one substantially flat surface of the core or inner cladding.

26 Claims, 6 Drawing Sheets

(56) References Cited

U.S. PATENT DOCUMENTS 5,448,665 A * 9/1995 Kershaw ............ G02B 6/29317 359/308
5,703,980 A * 12/1997 MacElwee ........... G02B 6/2551 385/30
6,064,783 A 5/2000 Congdon et al.
6,719,608 B1 * 4/2004 Koinkar .................. B24B 19/08 451/460
7,060,964 B1 * 6/2006 Pi ....................... G01K 11/3206 250/227.14
7,731,847 B2 * 6/2010 Ton That ............. B01D 61/025 203/10
9,268,096 B1 * 2/2016 Krasulick ................ G02B 6/30
9,746,612 B2 * 8/2017 Lipson ................. G02B 6/4291
2002/0197037 A1 * 12/2002 Bailey ..................... G01L 1/242 385/123
2003/0081902 A1 5/2003 Blauvelt et al.
2004/0120649 A1 * 6/2004 Klosowiak ............... G02B 6/30 385/49
2004/0218257 A1 * 11/2004 Chen ................... H01S 3/06708 359/341.1
2005/0117157 A1 * 6/2005 Tarsa ..................... G01N 21/39 356/437
2007/0122087 A1 5/2007 Levinson
2010/0278503 A1 * 11/2010 Nakai ................... C03C 25/105 385/142
2013/0230274 A1 9/2013 Fish
2015/0023631 A1 1/2015 Shastri et al.
2016/0077282 A1 3/2016 Lipson et al.
2019/0235171 A1 * 8/2019 Brusberg ........... G02B 6/02033

FOREIGN PATENT DOCUMENTS

SG 147214 11/2008
WO 2013103431 A2 7/2013
WO 2016025370 A1 2/2016

OTHER PUBLICATIONS

Chen et al. “A multi-D-shaped optical fiber for refractive index sensing” Sensors, 10(5) pp. 4794-4804 (2010).
International Search Report and Written Opinion PCT/US2017/013838 dated Apr. 7, 2017.
Quero et al. “Evanescent-wave LPFG in D-fiber by perioically patterned overlay” SPIE—International Society for Optical Engineering, 7952(8) pp. 76531G (2010).
Su et al. “Study on the output characteristics of a large-core Yb-doped ouble clad fiber laser” SPIE—International Society for Optical Engineering, 5627, p. 453 (2004).

* cited by examiner

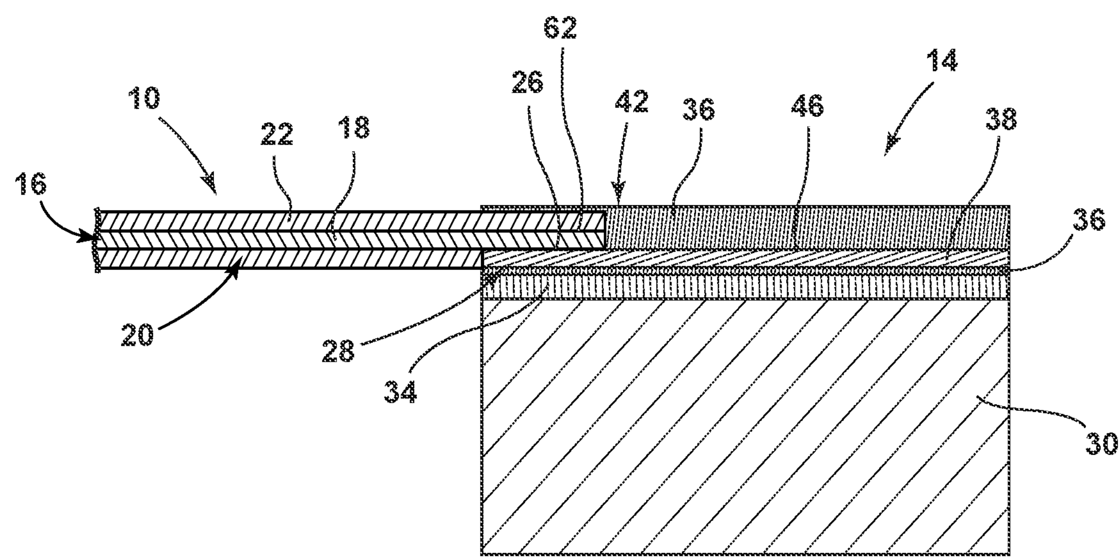
FIG. 1
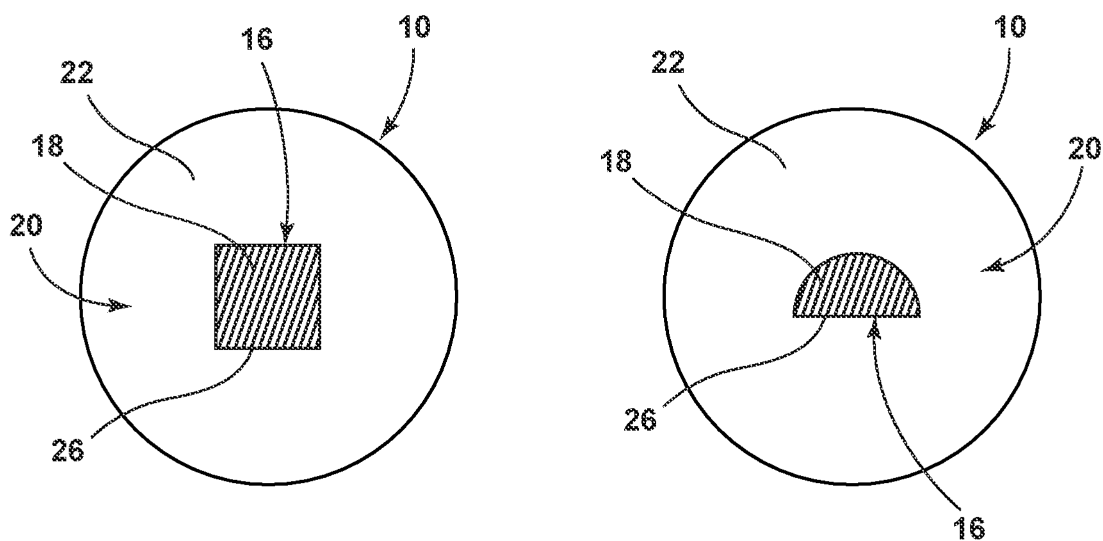
FIG. 2A
FIG. 2B

POLYMER CLAD FIBER FOR EVANESCENT COUPLING

This application claims the benefit of priority under 35 U.S.C. § 119 of U.S. Provisional Application Ser. No. 62/279,987 filed on Jan. 18, 2016 the content of which is relied upon and incorporated herein by reference in its entirety.

BACKGROUND

The present disclosure generally relates to methods and apparatus for evanescently coupling, and more particularly, relates to the stripping of an optical fiber to facilitate evanescent coupling.

Conventional photonic integrated circuits typically utilize both a silicon waveguide and a polymer waveguide which are evanescently coupled on the circuit. An optical fiber is then coupled to the polymer waveguide for providing optical signals to or from the photonic circuit. The use of the polymer waveguide on the photonic chip may lead to coupling losses which may deteriorate the optical signal. For example, optical attenuation in the polymer waveguide may lead to a loss of about 0.5 dB and coupling between the polymer waveguide and the optical fiber may result in an additional 1 dB of loss. Various additional methods of coupling the fiber to the circuit may decrease the signal loss, but generally will increase the fabrication complexity and cost of the fiber and/or the circuit, or decrease the bandwidth or channels. Additionally, coupling fibers together may lead to signal loss. Accordingly, a new manner of transmitting optical signals between optical fibers and/or photonic circuits is desirable.

SUMMARY

According to one aspect of the present disclosure, a fiber to waveguide coupler is provided that includes an optical fiber having a core and a cladding. The cladding includes an inner cladding and an outer cladding with a polymer. At least one of the core and inner cladding defines a substantially flat surface parallel with an axis of the optical fiber. The optical fiber defines a stripped portion substantially free of outer cladding configured to expose the at least one substantially flat surface of the core or inner cladding. A waveguide is configured to be evanescently coupled with the core through the exposed at least one substantially flat surface of the core or inner cladding.

According to another aspect of the present disclosure, a method of evanescent coupling is provided that includes the steps: providing an optical fiber having a core, an inner cladding and an outer cladding; providing a photonic integrated circuit comprising a waveguide positioned within a slot; stripping a portion of the outer cladding to expose at least a portion of the substantially flat surface; and positioning the stripped portion of the optical fiber within the slot such that the substantially flat surface is proximate the waveguide and the core is evanescently coupled with the waveguide.

According to yet another aspect of the present disclosure, a method of evanescently coupling is provided that includes the steps of providing an optical fiber having a core and a cladding which includes a polymeric material; preferentially stripping a portion of the polymeric material of the cladding from the optical fiber using a laser; providing a waveguide; and positioning the core of the optical fiber sufficiently close to the wave guide to evanescently couple the core of the optical fiber to the waveguide.

According to yet another aspect of the present disclosure, an optical fiber is provided which includes a glass core and a cladding. The cladding includes an inner glass cladding and an outer cladding having a polymer. The cladding defines a substantially flat surface parallel with an axis of the optical fiber offset from the core by less than about 10 μm.

Additional features and advantages will be set forth in the detailed description which follows, and, in part, will be readily apparent to those skilled in the art from that description or recognized by practicing the embodiments as described herein, including the detailed description which follows the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 1 is cross-sectional view of an optical fiber evanescently coupling with a photonic integrated circuit, according to one embodiment;

FIG. 2A is an enlarged cross-sectional view of an optical fiber, according to one embodiment;

FIG. 2B is an enlarged cross-sectional view of an optical fiber, according to one embodiment;

DETAILED DESCRIPTION

Figure 3A:
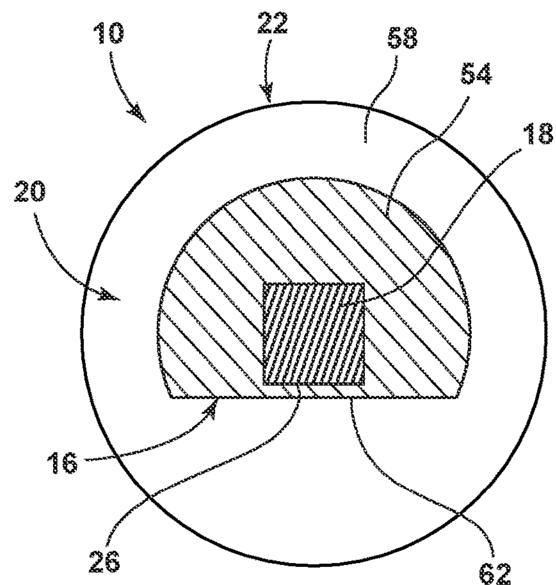
FIG. 3A is an enlarged cross-sectional view of an optical fiber, according to one embodiment.

Reference will now be made in detail to the present embodiments, examples of which are illustrated in the accompanying drawings. Whenever possible, the same reference numerals will be used throughout the drawings to refer to the same or like parts.

For purposes of description herein, the terms “upper,” “lower,” “right,” “left,” “rear,” “front,” “vertical,” “horizontal,” and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIG. 1, depicted is an optical fiber 10 coupled to a photonic integrated circuit 14. The optical fiber 10 includes a glass portion 16 and a polymeric portion 20. The glass portion 16 may include a core 18 and an inner cladding 54 (FIG. 3A). The polymeric portion 20 may include an outer cladding 58 (FIG. 3A) positioned around the glass portion 16. The inner cladding 54 and the outer cladding 58 may cooperate to form a cladding 22 disposed around the core 18. The glass portion 16 may define one or more substantially flat surfaces, such as a core surface 26 (FIG. 3A) or a cladding surface 62 (FIG. 3A). The flat surfaces (e.g., core surface 26 or cladding surface 62) may be parallel with an axis of the fiber 10 and/or extend coaxially with the optical fiber 10 for either a portion of the fiber 10 or the entire length of the fiber 10. The optical fiber 10 may include one or more stripped portions 28 where a portion, or all of the polymeric portion 20 (e.g., all or part of the cladding 22), has been removed or stripped from the optical fiber 10 such that one or more of the flat surfaces (e.g., the core surface 26 and/or cladding surface 62) are exposed. The glass core 18 may be composed of pure silica, doped silica (e.g., doped with germanium, aluminum, and/or chlorine) and/or other optically transparent materials. The inner cladding 54 may be composed of pure silica, doped silica (e.g., fluorine and/or boron) or other optically transparent materials. The optical fiber 10 may be a single mode fiber or may be a multi-mode fiber. The core 18 may have a higher refractive index than the inner cladding 54. The core 18 may have a relative refractive index change, or delta, relative to the inner cladding 54 in the range of about 0.2% to about 3.0%, for example about 0.34%, about 0.5%, about 1.0%, about 1.5%, about 2.0%, about 2.5% or about 3.0%. The core 18, inner cladding 54 and/or outer cladding 58 may be tapered. The cladding 22 may be a composite (e.g., inner cladding 54 is composed of glass and the outer cladding 58/polymeric portion 20 is composed of a polymer). The refractive indexes of the materials of the cladding 22 may have a lower refractive index than the core 18. It will be understood that the optical fiber 10, as described herein, may simply be a connection or connector to another longer or larger optical fiber.

Referring again to FIG. 1, the photonic integrated circuit 14 includes a substrate 30 having a buried oxide layer 34, a top oxide layer 36 and a waveguide 38. The waveguide 38 may include silicon, silicon nitride, glass, polymers, combinations thereof and/or other materials. The substrate 30 may be a silicon substrate, glass substrate or other support structure capable of supporting and defining optical devices. The top oxide layer 36 is configured to define a slot 42 within which the optical fiber 10 and the waveguide 38 are positioned. The buried oxide layer 34 may be formed at the bottom surface of the top oxide layer 36 of the substrate 30 or be positioned on a surface of the substrate 30. The buried oxide layer 34 may be formed prior to selective bonding of the top oxide layer 36 to the bulk substrate 30. Further, the buried oxide layer 34 may be formed by oxygen implanting to a desired depth within the substrate 30. The slot 42 may be formed in the top oxide layer 36 via etching, mechanical forming, or other conventional methods known in the art. The slot 42 may have a depth of between about 5 μm and about 200 μm, or between about 10 μm and about 125 μm, or between about 15 μm and about 50 μm. The slot 42 may have a width of between about 5 μm and about 10 μm, or between about 50 μm and about 125 μm, or between about 125 μm and about 200 μm. The slot 42 is shaped and sized to accept the stripped portion 28 of the optical fiber 10. The waveguide 38 may be planar and is positioned within the top oxide layer 36 and within the slot 42. The waveguide 38 may be a silicon waveguide 38 configured to carry an optical signal along the photonic integrated circuit 14 to a detector or other optical circuitry located on or off the circuit 14. The waveguide 38 may have a mode field diameter similar to that of the optical fiber 10 and may be tapered or not tapered in a direction transverse to the direction of light propagation along the length of the waveguide 38. The waveguide 38 may be tapered, or reduced, to less than about 70%, less than about 60%, or less than about 50% of its original width (e.g., from about 200 nm to about 120-160 nm). Doping of the core 18 may facilitate a less narrow taper of the waveguide 38 to be achieved. The waveguide 38 defines a waveguide surface 46 which may be substantially flat and configured to couple with the core 18 through the core surface 26 and/or the cladding surface 62 of the inner cladding 54.

The optical fiber 10 is configured to carry one or more optical signals along the core 18. The placement of the stripped portion 28 of the optical fiber 10 within the slot 42 places the optical fiber 10 in close, intimate, contact with the waveguide 38 such that optical signals may be transferred between the two. For example, the core surface 26 and/or the cladding surface 62 of the stripped portion 28 are sufficiently proximate to the waveguide surface 46 of the waveguide 38 in the plane of the substrate 30 for an evanescent field of light propagating through the optical fiber 10 to enter the waveguide 38, or vice versa. Evanescent coupling between the optical fiber 10 and the waveguide 38 may transfer greater than about 1%, greater than about 5%, greater than about 10%, greater than about 25%, greater than about 50%, greater than about 60%, greater than about 70%, greater than about 80%, greater than about 90%, or about substantially 100% of the optical power between the optical fiber 10 and the waveguide 38. The core surface 26 and/or cladding surface 62 may overlap the waveguide surface 46 of the waveguide 38 between about 10 μm and about 3000 μm to facilitate evanescent coupling. Tapering of the waveguide 38 such that the effective index of the waveguide 38 matches that of the core 18 may facilitate or increase the power transfer between the optical fiber 10 and the waveguide 38.

Referring now to FIGS. 2A-3C, depicted are various embodiments of the optical fiber 10 having different configurations of the glass portion 16 and the polymeric portion 20. In order for the core surface 26 of the core 18 and/or the cladding surface 62 to get close enough to the waveguide surface 46 (FIG. 1) of the waveguide 38 (FIG. 1) to facilitate evanescent coupling, the core 18 and inner cladding 54 may take a variety of cross-sectional shapes configured to expose the core surface 26 and/or cladding surface 62 once the polymeric portion 20 has been stripped off. The cross-sectional shape of the core 18 may be square (FIGS. 2A and 3A), D-shaped (FIG. 2B), round or circular (FIG. 3B), a truncated circle (FIG. 3C), triangular, rectangular, truncated triangular or other polygons configured to define the core surface 26 which extends along a length of the core 18. The cross-sectional shape of the core 18 may extend the entire length of the core 18 or may only extend for a portion of the core 18 (e.g., the area intended to be the stripped portion 28 (FIG. 1)). The cross-sectional shape of the core 18 and/or the glass portion 16 may be developed in the preform stage of the optical fiber 10, and the core 18 and/or the glass portion 16 of the preform may have specific geometries (e.g., corners removed) applied to maintain the core surfaces 26 of the core 18 during production of the optical fiber 10. The core 18 may have a diameter, largest straight line dimension or width of the flat surface 26 of about 6 μm, about 7 μm, about 8 μm, about 9 μm, about 10 μm, about 11 μm, about 12 μm, about 13 μm, about 14 μm or about 50 μm. The diameter of the core 18 may be large enough such that the mode field diameter of the core 18 is approximately that of a single mode fiber. The diameter of the core 18 may also be configured for specific design purposes to have a large or small mode field diameter. The diameter of the optical fiber 10 may be greater than about 80 μm, greater than about 100 μm, greater than about 110 μm, greater than about 120 μm, greater than about 130 μm or greater than about 140 μm. In a specific example, the diameter of the optical fiber 10 may be about 125 μm.

Figure 3B:
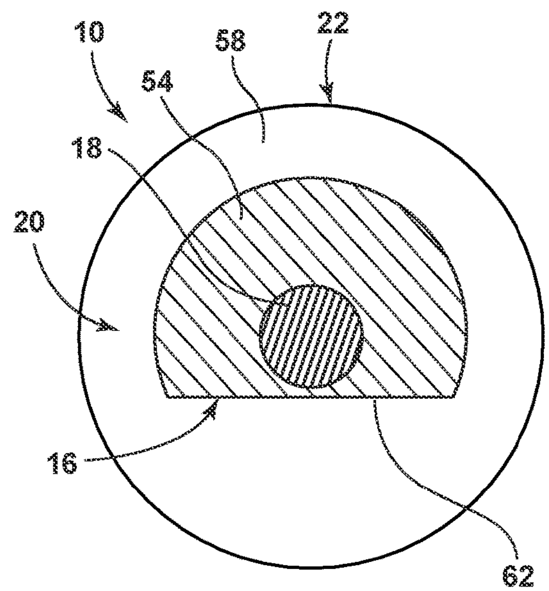
FIG. 3B is an enlarged cross-sectional view of an optical fiber, according to one embodiment.
Figure 3C:
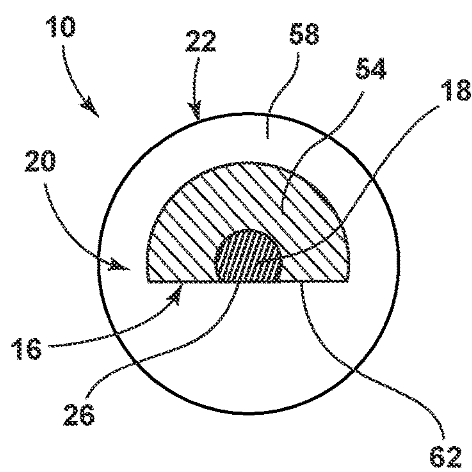
FIG. 3C is an enlarged cross-sectional view of an optical fiber, according to one embodiment.

Referring now to FIGS. 3A-3C, as explained above, the cladding 22 of the optical fiber 10 may be divided into the inner cladding 54 and the outer cladding 58 (e.g., polymeric portion 20). The outer cladding 58 may include a glass, a polymeric material or composites thereof. The polymeric material may include high density polyethylene, low density polyethylene, polystyrene, polymethylmethacrylate, nylon, acrylate, silicone, silicone based materials, fluorinated acrylates, polyimide, ethylene tetrafluoroethylene, fluoroacrylate, fluoromethacrylate and combinations thereof. The polymeric material may be optically transparent. The polymeric portion 20 may have a diameter ranging from between about 40 μm and about 500 μm, between about 80 μm and about 250 μm or between about 100 μm and 150 μm. In a specific example, the polymeric portion 20 is sufficiently thick that the core 18 and the cladding 22 have a diameter of about 125 μm. A polymeric jacket may be disposed around the outer cladding 58. The polymeric jacket may have a lower optical transparency than the outer cladding 58. The polymeric portion 20 may have a refractive index only slightly above or below that of the inner cladding 54. The inner cladding 54 may include a glass or material other than polymers such that the cladding 22 is a composite cladding 22. The inner cladding 54 may have a general square, circular, triangular, polygonal or D-shape similar to that of the core 18 of FIG. 2B. The diameter, or longest cross-sectional length, of the inner cladding 54 may range from between about 15 μm to about 170 μm, from about 20 μm to about 150 μm, from about 30 μm to about 140 μm, from about 40 μm to about 125 μm or from about 50 μm to about 115 μm. The inner cladding 54 may have a refractive index the same or substantially similar to that of the outer cladding 58. In some embodiments, the outer cladding 58 may have a lower refractive index than the inner cladding 54 (e.g., to prevent tunneling loss). In the depicted embodiments, the D-shape of the inner cladding 54 defines the cladding surface 62 which is configured to intimately couple with the waveguide surface 46 (FIG. 1) of the waveguide 38 (FIG. 1). It will be understood that in embodiments not utilizing the inner cladding 54, the cladding 22 or outer cladding 58 may define the cladding surface 62. The cladding surface 62 may be offset from the core surface 26 of the core 18 (FIGS. 3A and 3B) or may be in line, or aligned with, the core surface 26 (FIG. 3C). The cladding surface 62 may be offset from the core surface 26 of the core 18 by between about 0.1 μm and about 10 μm, or between about 1 μm and about 5 μm. If very strong coupling between the optical fiber 10 and the waveguide 38 is desired, the example depicted in FIG. 3C may be used. The outer cladding 58 may have a diameter of between about 25 μm and about 500 μm, or between about 50 μm and about 250 μm or between about 100 μm and about 125 μm.

Figure 4A:
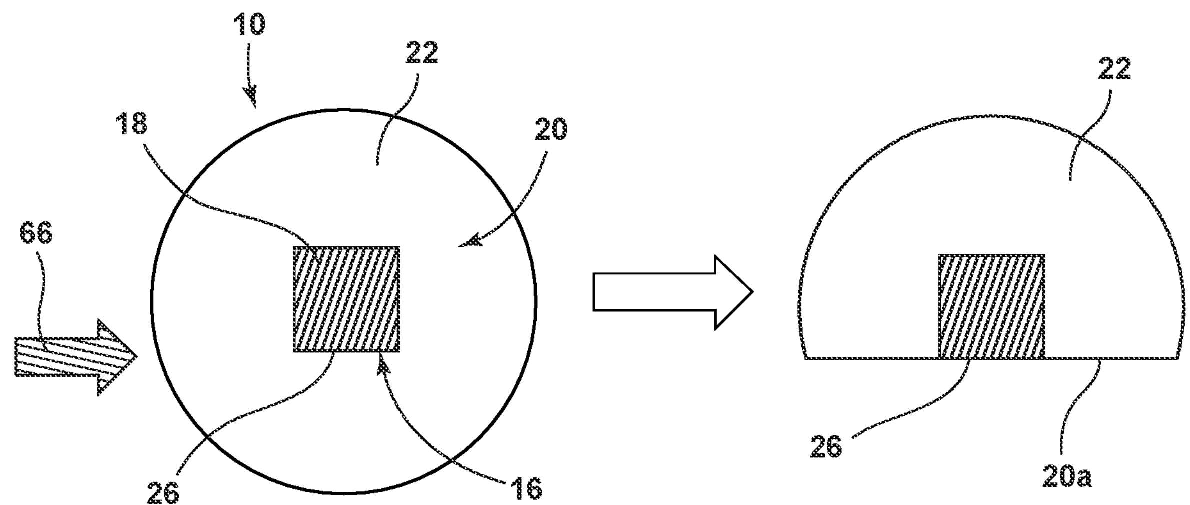
FIG. 4A is an exemplary method of stripping a cladding from a core of an optical fiber, according to one embodiment.
Figure 4B:
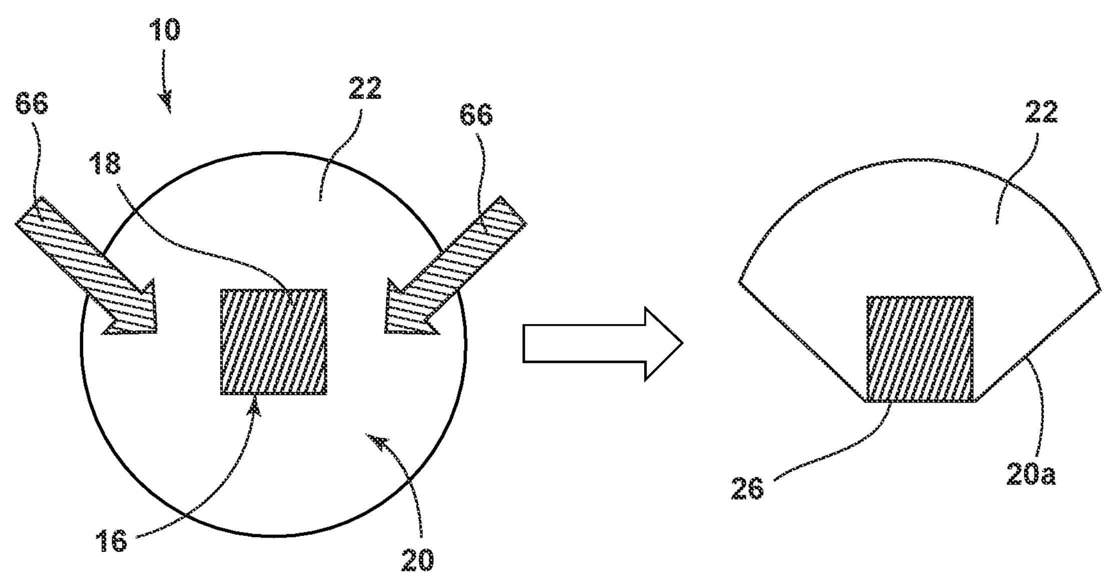
FIG. 4B is an exemplary method of stripping a cladding from a core of an optical fiber, according to one embodiment.
Figure 4C:
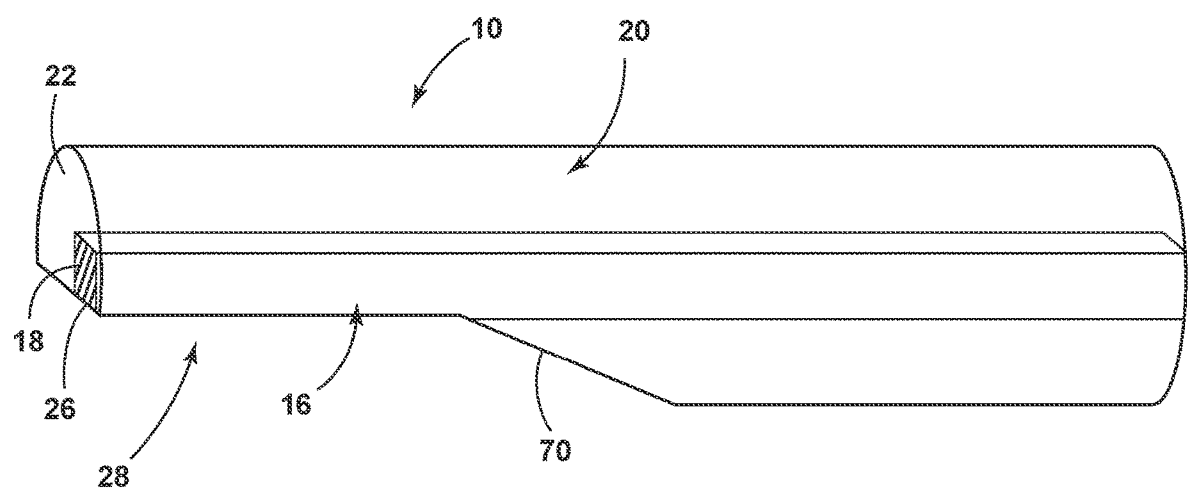
FIG. 4C is a perspective view of a stripped portion of an optical fiber, according to one embodiment.

Referring now to FIGS. 4A-4C, the polymeric portion 20 may be removed from the optical fiber 10 to form the stripped portion 28 via a variety of methods. In a first example, the polymeric portion 20 may be stripped from the core 18 using one or more laser beams 66. For example, the laser beams 66 may emanate from a gas laser (e.g., $CO_2$, Ar, HeNe, HeAg and/or NeCu), a chemical laser, an excimer laser, a solid state laser and/or other sources of laser beams 66. In the depicted examples, one or more laser beams 66 may be directed at the polymeric portion 20. The difference in optical absorption and/or evaporation temperature between the material of the polymeric portion 20 and the glass portion 16 (e.g., core 18 and inner cladding 54 (FIG. 3A)) permits selective or preferential removal of the polymeric portion 20 or outer cladding material 58 (FIG. 3A). The laser beams 66 may be applied to the polymeric portion 20 such that the optical fiber 10 has a profiled shape which may aid in alignment and positioning of the fiber 10 within the slot 42 (FIG. 1) and coupling to the waveguide 38 (FIG. 1). In the depicted example of FIG. 4A, a single laser beam 66 has been applied to the optical fiber 10 to remove the polymeric portion 20 such that the polymeric portion 20 defines a polymeric surface 20*a* which is aligned with the core surface 26 of the core 18. In the depicted example of FIG. 4B, one or more laser beams 66 may be applied to the polymeric portion 20 such that the polymeric portion 20 is removed from the core surface 26 of the core 18 and the polymeric portion 20 of the optical fiber 10 is profiled in a V-shape. The polymeric portion 20 may be profiled such that the polymeric surface 20*a* forms an angle between about 1° and about 60°, or between about 20° and about 55°, relative to the core surface 26. In a specific example, the angle of the polymeric surface 20*a* may be about 45°. In another embodiment, a chemical etchant (e.g., methylene chloride) may be applied to the optical fiber 10 which is configured to preferentially remove the polymeric portion 20 without damaging the core 18. In yet another embodiment, the polymeric portion 20 may be thermally stripped from the core 18 using a thermal stripping tool. The thermal stripper may melt or soften the polymeric portion 20 without softening the core 18 such that the polymeric portion 20 may be removed without damaging the core 18 or inner cladding 54. In yet another embodiment, the polymeric portion 20 may be mechanically removed from the core 18 or inner cladding 45 via grinding, slicing, stripping, a miller stripper and/or other acceptable methods.

During the stripping of the polymeric portion 20, a visual alignment system may be utilized. An exemplary alignment system may include a rotational stage on which the optical fiber 10 would be placed. An end face of the optical fiber 10 could be imaged using a camera and then rotated such that the fiber 10 is aligned with the stripping system that is used. In embodiments utilizing the inner cladding 54, the cladding surface 62 may be polished post stripping to ease coupling of the optical fiber 10 to the waveguide 38.

Referring now to FIG. 4C, the polymeric portion 20 of the optical fiber 10 may be stripped not only to form a cross-sectional profile, but the polymeric portion 20 may be stripped to transition between the stripped portion 28 and an unstripped portion (e.g., the remainder of the optical fiber 10). In the depicted embodiment, the polymeric portion 20 may be stripped to form a transition portion 70 which transitions the optical fiber 10 from the stripped portion 28 to the unstripped polymeric portion 20. In various embodiments, the transition portion 70 may be configured to transition the optical fiber 10 to the stripped portion 28 adiabatically (e.g., the rate of change of the effective index of the guided optical wave may be smaller than the wavelength of the light in the core 18) such that optical loss is minimized through the transition portion 70. In the depicted example, the transition portion 70 is angled, but may take a variety of shapes configured to transition the optical fiber 10 between the stripped portion 28 and the unstripped polymeric portion 20.

Figure 5:
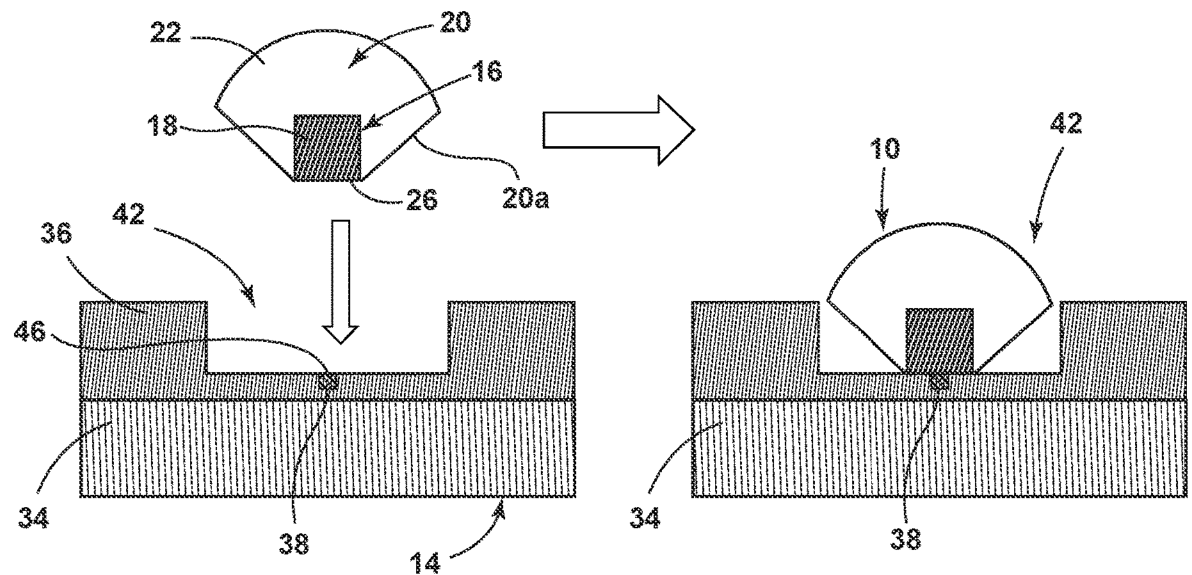
FIG. 5 is an exemplary method of coupling an optical fiber to a photonic integrated circuit, according to one embodiment.
Figure 6:
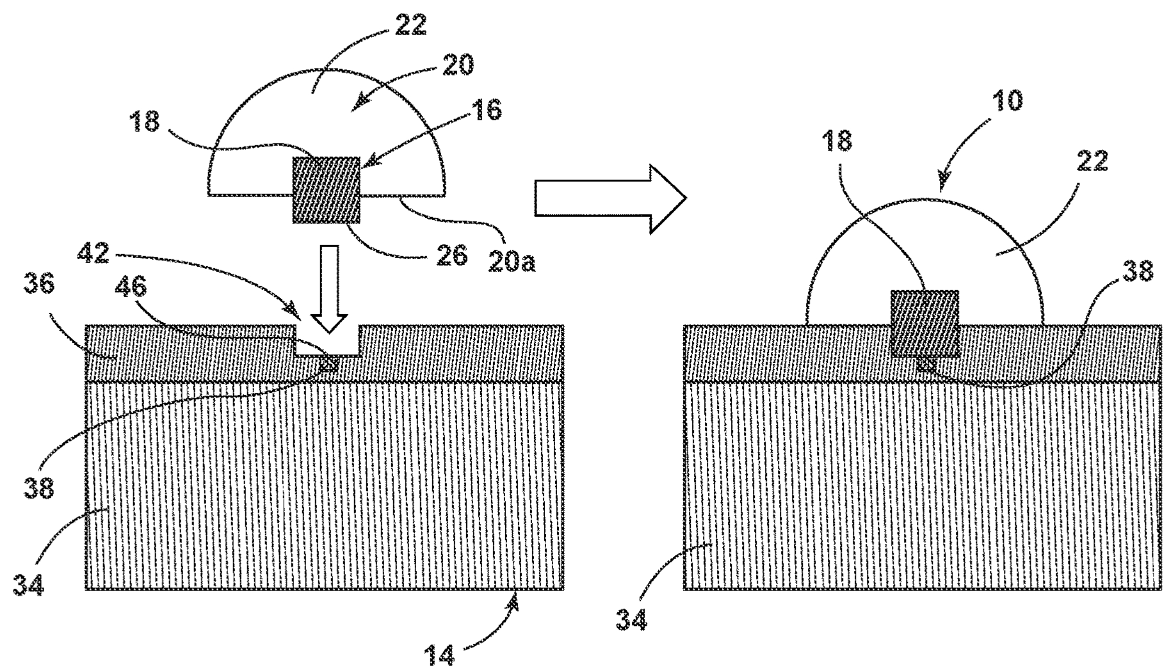
FIG. 6 is an exemplary method of positioning an optical fiber to a photonic integrated circuit, according to one embodiment.

Referring now to FIGS. 5 and 6, once the polymeric portion 20 has been stripped from the optical fiber 10 to form the stripped portion 28 (FIG. 1), the stripped portion 28 may be positioned within the slot 42. As explained above, positioning of the stripped portion 28 of the optical fiber 10 within the slot 42 may evanescently couple the core 18 of the optical fiber 10 to the waveguide 38 of the photonic integrated circuit 14. It will be understood that a high index coupling agent (e.g., an epoxy) may be disposed between the core 18 and/or inner cladding 54 (FIG. 1) and the waveguide 38 to counter any thermal movement and to enable more efficient coupling.

Referring now to FIG. 5, as explained above, the optical fiber 10 may be profiled in the stripped portion 28 such that the polymeric portion 20 forms a general V-shape. Such a V-shape may be advantageous in providing the optical fiber 10 with a "self-centering" attribute allowing for easy coupling of the core 18 to the waveguide 38. The V-shape of the polymeric portion 20 permits the optical fiber 10 to contact the top oxide layer 36 during insertion while guiding the core surface 26 of the core 18 and/or cladding surface 62 toward the waveguide surface 46 of the waveguide 38. It will be understood that the slot 42 may also have a general V-shape to aid in insertion of the optical fiber 10.

Referring now to FIG. 6, in the depicted example, the polymeric portion 20 has been removed from a portion of three of the flat surfaces 26 of the core 18. In such an embodiment, the slot 42 may be dimensioned only slightly larger (e.g., greater than about 0.1 μm, greater than about 0.5 μm, greater than about 1.0 μm or greater than about 2 μm) than the core 18 such that the core 18 may couple with the slot 42 and the waveguide 38. The polymeric surface 20*a* of the polymeric portion 20 may contact the top oxide layer 36 external to the slot 42 and aid in securing of the optical fiber 10 to the photonic integrate circuit 14. In the depicted example, only the core 18 (e.g., or core 18 and inner cladding 54 in associated embodiments) is within the slot 42 and the polymeric portion 20/cladding 22 is outside of the slot 42. Put another way, the cladding 22 is not in the slot 42.

Figure 7:
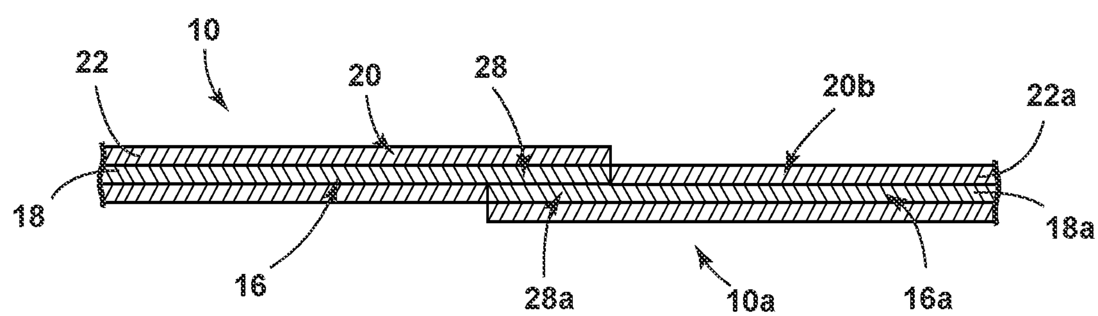
FIG. 7 is an exemplary method of positioning an optical fiber to a second optical fiber, according to one embodiment.

Referring now to FIG. 7, the optical fiber 10 may be evanescently coupled to a second optical fiber 10*a* having a second glass portion 16*a* and a second polymeric portion 20*b*. The second polymeric 20*b* may be stripped in a substantially similar manner to that described in connection with the polymeric portion 20 above such that a second striped portion 28*a* is formed where a portion of a second cladding 22*a*, or second polymeric portion 20*b*, is removed. By positioning the stripped portion 28 of the optical fiber 10 and the second stripped portion 28*a* of the second optical fiber 10*a* sufficiently close, the core 18 of the optical fiber 10 may be evanescently coupled with a second core 18*a* of the second optical fiber 10*a* similarly to that explained above between the waveguide 38 and the optical fiber 10. One or more coupling agents, clamps or other devices may be used to secure the optical fiber 10 to the second optical fiber 10*a*.

Use of the present disclosure may offer several advantages over existing techniques for coupling optical fibers 10 to photonic integrated circuits 14 and to other optical fibers. First, evanescent coupling allows for in plane light output, broadband optical performance, and low optical loss. In plane light output where the light stays in the same plane as the optical fiber 10 and the photonic integrated circuit 14 means there may not be a need for an additional photonic turn and the packaging may be compact. Use of evanescent coupling allows for potentially no loss of optical power. Further, use of the polymeric portion 20 having the stripped portion 28 may allow for quick, easy and accurate placement of the optical fiber 10 within the photonic integrated circuit 14 or to another optical fiber. The profiled shapes disclosed herein allow for the macro-nature of the optical fiber 10 to be retained (e.g., the cladding 22 and/or polymeric portion 20) while providing structures (e.g., the V-shape of the optical fiber 10) that facilitate micro-precision placement (e.g., the core surface 26 or the cladding surface 62 proximate the waveguide surface 46 of the waveguide 38). Additionally, by leveraging the highly accurate fiber drawing process, the coupling loss of the optical fiber 10 to the waveguide 38 due to the highly uniform core surface 26 and cladding surface 62 may be minimal and highly repeatable.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit, unless the context clearly dictates otherwise between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

For purposes of this disclosure, the term "coupled" (in all of its forms: couple, coupling, coupled, etc.) generally means the joining of two components (optical, electrical or mechanical) directly or indirectly to one another. Such joining may be stationary in nature or movable in nature. Such joining may be achieved with the two components (optical, electrical or mechanical) and any additional intermediate members being integrally formed as a single unitary body with one another or with the two components. Such joining may be permanent in nature, or may be removable or releasable in nature, unless otherwise stated. It will be apparent to those skilled in the art that various modifications and variations can be made without departing from the spirit or scope of the claims.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fiber to waveguide coupler comprising:

an optical fiber having a core and a cladding, the cladding comprising an inner cladding and an outer cladding comprising a polymer, at least one of the core and inner cladding having a substantially flat surface parallel with an axis of the optical fiber, the flat surface extending along the entire length of the optical fiber, wherein the optical fiber includes a stripped portion substantially free of the outer cladding configured to expose at least a portion of the at least one substantially flat surface of the core or inner cladding, and wherein a transition portion between the stripped portion and the outer cladding is adiabatic; and a waveguide configured to evanescently couple with the fiber through the exposed at least one substantially flat surface of the core or inner cladding, wherein the stripped portion of the optical fiber and the waveguide extend into and couple within a slot.

2. The fiber to waveguide coupler of claim 1, wherein the waveguide is a planar waveguide positioned on a photonic integrated circuit.

3. The fiber to waveguide coupler of claim 1, wherein the core and the inner cladding each include a substantially flat surface.

4. The fiber to waveguide coupler of claim 3, wherein the substantially flat surface of the core and the substantially flat surface of the inner cladding are offset.

5. The fiber to waveguide coupler of claim 3, wherein the substantially flat surface of the core and the substantially flat surface of the inner cladding are aligned with one another.

6. The fiber to waveguide coupler of claim 1, wherein only the inner cladding includes a substantially flat surface.

7. The fiber to waveguide coupler of claim 1, wherein the polymer is at least one of a fluorinated acrylate and a silicone.

8. A method of evanescent coupling comprising the steps:

providing an optical fiber having a core, an inner cladding and an outer cladding, the core comprising glass, wherein the inner cladding defines a substantially flat surface extending along the entire length of the optical fiber and the outer cladding comprises a polymeric material;

providing a photonic integrated circuit comprising a waveguide positioned within a slot;

stripping a portion of the outer cladding to expose at least a portion of the substantially flat surface; and positioning the stripped portion of the optical fiber within the slot such that the exposed substantially flat surface is proximate the waveguide and the core is evanescently coupled with the waveguide.

9. The method of claim 8, wherein the waveguide is tapered in a direction perpendicular to a direction of light propagation through the waveguide.

10. The method of claim 8, wherein the slot of the photonic integrated circuit is defined by an oxide and the stripping of the outer cladding creates a V-shaped profile to the optical fiber.

11. The method of claim 10, wherein the inner cladding has a higher refractive index than the outer cladding.

12. The method of claim 8, wherein only the core is positioned within the slot.

13. The method of claim 8, wherein a transition between the stripped portion and the outer cladding is adiabatic.

14. An optical fiber comprising:

a glass core; and a cladding, the cladding comprising an inner glass cladding and an outer cladding comprising a polymer, wherein the cladding includes a substantially flat surface parallel to an axis of the optical fiber, the substantially flat surface extending along the entire length of the optical fiber and being offset from the core by less than about 10 μm.

15. The optical fiber of claim 14, wherein the outer cladding has a refractive index the same or lower than the inner cladding.

16. The optical fiber of claim 14 further comprising:

a stripped portion where the outer cladding is removed to expose a portion of the substantially flat surface.

17. The optical fiber of claim 16, wherein a cross-sectional shape of the optical fiber at the stripped portion is substantially a D-shape.

18. The optical fiber of claim 16, wherein a cross-sectional shape of the optical fiber at the stripped portion is substantially a V-shape.

19. The optical fiber of claim 14, wherein the polymer is at least one of a fluorinated acrylate and a silicone.

20. The optical fiber of claim 19, wherein the outer cladding has a diameter between about 100 μm and about 150 μm.

21. The optical fiber of claim 14, wherein the outer cladding comprises a transition portion between the stripped portion and an unstripped portion of the optical fiber, and wherein the transition portion is configured to transition adiabatically from the unstripped portion to the stripped portion.

22. The optical fiber of claim 1, wherein the inner cladding comprises glass.

23. The fiber to waveguide coupler of claim 1, wherein the waveguide is tapered in a direction perpendicular to a direction of light propagation through the waveguide.

24. The fiber to waveguide coupler of claim 1, wherein the outer cladding is tapered.

25. The fiber to waveguide coupler of claim 1, wherein the outer cladding has a lower refractive index than the inner cladding.

26. The optical fiber of claim 14, wherein the outer cladding has a lower refractive index than the inner cladding.

* * * * *

UNITED STATES PATENT AND TRADEMARK OFFICE

CERTIFICATE OF CORRECTION

PATENT NO. : 10,545,290 B2
APPLICATION NO. : 15/405396
DATED : January 28, 2020
INVENTOR(S) : Kevin Wallace Bennett et al.

It is certified that error appears in the above-identified patent and that said Letters Patent is hereby corrected as shown below:

On the Title Page

On page 2, in Column 2, item (56), Other Publications, Line 5, delete “perioically” and insert -- periodically --, therefor.

On page 2, in Column 2, item (56), Other Publications, Line 9, delete “ouble” and insert -- double --, therefor.

Signed and Sealed this
Twenty-eighth Day of April, 2020

Andrei Iancu
*Director of the United States Patent and Trademark Office*